Aug. 31, 1937.                    R. NEUHAUS                    2,091,874
                               FLOW BEAN INDICATOR
                               Filed May 21, 1936
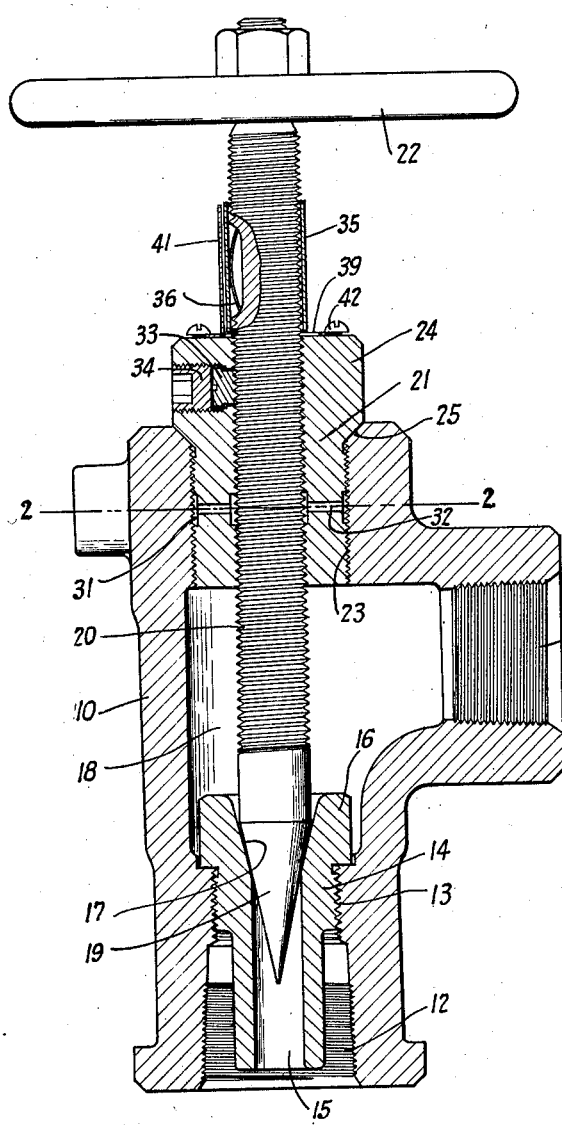
Ralph Neuhaus INVENTOR
BY Jesse R. Stone
ATTORNEY Patented Aug. 31, 1937

2,091,874

UNITED STATES PATENT OFFICE 2,091,874

FLOW BEAN INDICATOR

Ralph Neuhaus, Houston, Tex., assignor to Hughes Tool Company, Houston, Tex., a corporation of Texas Application May 21, 1936, Serial No. 81,005

2 Claims. (Cl. 116—125)

This invention relates to flow beans such as are employed in controlling the amount of flow through a fluid conducting line.

It is an object of the invention to provide a flow bean construction which is strong and compact.

It is another object to provide a particularly sturdy and easily operated valve stem support.

It is a further object to provide means to effectively lubricate the threads upon the valve stem and the supporting plug so that a seal will be assured and also so that the threads may be screwed up or unscrewed without difficulty.

It is also desired to form a simple and economical type of indicator for the valve.

In the drawing herewith Fig. 1 is a central longitudinal section through a choke valve illustrating the invention.

Fig. 2 is a transverse section on the plane 2—2 of Fig. 1.

Fig. 3 is a broken side elevation of the indicator.

Fig. 4 is a perspective view showing the indicator plate.

My flow bean or choke valve includes a housing 10 such as is employed in angle valve construction. It has a lateral inlet port 11 for connection in the fluid conducting line and may be placed on one of the branches of the Christmas tree of a well head assembly, or at any preferred point in the flow line.

There is an outlet port 12 threaded for connection with the discharge line for the fluid. The interior of the outlet port is somewhat constricted and internally threaded at 13 to receive a choke member 14. Said choke member has a passage 15 therethrough which is smaller than the flow lines with which my bean is connected. The upstream end of this member is formed with a head 16 which abuts with the inner wall of the inner chamber 18 of the housing. The interior of the head 16 is tapered at 17 to form a seat into which a needle valve 19 may engage.

The needle valve 19 has a slightly steeper taper than has the seat 17 for purposes of better controlling the choke orifice between the valve and seat. The passage 15 through the choke is made as long as convenient so that its endurance to wear will be increased.

The needle valve 19 is formed upon the end of the valve stem 20 which is externally threaded to engage within the threaded opening longitudinally of the supporting nut or plug 21. The outer end of the stem is formed with the hand wheel 22 or other equivalent means for rotating the said stem.

The plug 21 is screwed within a port or opening 23 in the housing 10, and extends into the port so as to come about flush with the interior wall of the chamber 18. It is also extended outwardly beyond the outer wall of the housing and has an enlarged head 24 thereon. The head 24 is tapered or beveled at 25 to engage a tapered seat in the housing and thus assists in maintaining the seal. The threaded passage through the plug is thus a long one and furnishes a firm and strong support for the stem.

Provision is made for lubricating the stem and threaded port 23 by means of a lubricator device shown best in Fig. 2. A lateral boss 26 is formed on the housing. A passage or chamber 27 is formed in this boss and a threaded plug 28 is adapted to screw into the outer end of the passage. The inner end of the passage connects with the threaded interior of the port 23 in the housing. To receive the lubricant a circumferential groove 31 is formed in the plug 21. A valve 30 set within a valve retainer 29 is used in the inner end of the chamber 27 to check outward flow of lubricant from the said groove.

The groove 31 connects with a plurality of radial passages 32 which serve to conduct the lubricant inwardly to the threaded area of the valve stem 20.

A locking pin 33 may be employed within a radial opening in the head 24 of the plug 21. Said pin is forced into locking contact with the stem by a threaded nut 34 screwed within the opening. By means of this locking pin the valve stem may be fixed against rotation when desired, but may be released by the unscrewing of the nut 34.

An indicator for the valve is placed upon the stem 20 toward its outer end. This indicator comprises a sleeve 35 having an internal diameter formed to fit freely over said stem. It is held adjustably against movement relative to said stem by means of a spring 36 fitting within a slot in the side of said stem and having a strong frictional contact with the interior of the sleeve. On the outer surface of said sleeve 35 is marked a series of numerals 37 with which a pointer 38 is positioned to register to indicate the position of the valve.

Said pointer is shown best in Fig. 4. It is made from a thin circular disc of sheet metal 39. A cut is made in the disc as shown at 40 and the arm 41 of the pointer is bent upwardly along its uncut edge. The opening 40 is large enough to receive the valve stem and the pointer 38 will register successively with the numerals 37 as the stem 20 and sleeve 35 are rotated in setting the valve. The disc 39 is circular and is held upon the outer end of the plug 24 by screws 42 which engage in the outer end of the plug and have heads which overlap the margin of the disc. The pointer can be set originally to indicate zero on the scale 37 when the valve is in proper position and then the screws 42 can be tightened to hold the pointer in fixed position thereafter.

The operation of my flow bean is not materially different from other flow beans. It has the advantage of being simple and compact due to the manner in which the stem is supported in the plug 24. It has a long and sturdy support in the plug. No stuffing box or packing is necessary. The long threaded connection, when supplied with heavy lubricant, will not leak and is free to be adjusted when necessary. Also the plug 24 has its threads lubricated so that it will not corrode or freeze in position. It may thus be easily removed whenever it is necessary to withdraw the valve or the valve seat 16.

The construction of the indicator is simple and economical to manufacture and is easily and accurately adjusted so that the exact position of the valve relative to the seat can be determined.

What I claim as new is:

1. A valve housing, a valve therein, a valve stem on said valve projecting from said housing, a sleeve on said valve stem outside said housing, resilient means to hold said sleeve in fixed position on said stem, an indicator including a disc held adjustably associated with said housing, an arm on said disc, and a pointer on said arm registering with marks on said sleeve.

2. An indicator for attachment to a valve stem extending from a valve housing, including a sleeve on said valve stem outside said housing, resilient means to hold said sleeve in fixed position on said stem, an indicator including a disc having an opening to fit about said valve stem, means to hold said disc frictionally in position relative to said housing but allowing circumferential adjustment, an arm on said disc, and a pointer on said arm registering with marks on said sleeve.

RALPH NEUHAUS.